United States Patent
Gilmer et al.

(10) Patent No.: US 7,395,897 B2
(45) Date of Patent: Jul. 8, 2008

(54) ACCELERATED WEIGHT DROP CONFIGURABLE FOR USE AS A SHEAR WAVE SEISMIC ENERGY SOURCE AND A METHOD OF OPERATION THEREOF

(75) Inventors: Allen L. Gilmer, Austin, TX (US); Clinton R. Vedders, Princeton, MN (US)

(73) Assignee: Vecta Oil & Gas, Ltd., Dallas, TX (US)

( * ) Notice: Subject to any disclaimer, the term of this patent is extended or adjusted under 35 U.S.C. 154(b) by 462 days.

(21) Appl. No.: 10/997,847

(22) Filed: Nov. 23, 2004

(65) Prior Publication Data

US 2005/0224279 A1 Oct. 13, 2005

Related U.S. Application Data

(60) Provisional application No. 60/560,903, filed on Apr. 9, 2004.

(51) Int. Cl.
*G01V 1/147* (2006.01)
(52) U.S. Cl. .................. 181/121; 181/101; 181/114
(58) Field of Classification Search .......... 181/121, 181/114, 113
See application file for complete search history.

(56) References Cited

U.S. PATENT DOCUMENTS

| | | | | | |
|---|---|---|---|---|---|
| 3,130,809 | A | * | 4/1964 | Flatow | 181/114 |
| 4,147,228 | A | * | 4/1979 | Bouyoucos | 181/119 |
| 4,284,164 | A | * | 8/1981 | Airhart | 181/117 |
| 4,354,572 | A | | 10/1982 | Martin | 181/116 |
| 4,390,077 | A | * | 6/1983 | Fulkerson | 181/121 |
| 4,402,381 | A | * | 9/1983 | Airhart | 181/114 |
| 4,660,674 | A | * | 4/1987 | Airhart | 181/113 |
| 4,702,344 | A | * | 10/1987 | Airhart | 181/121 |
| 4,703,344 | A | * | 10/1987 | Hisano et al. | 348/742 |
| 4,747,466 | A | | 5/1988 | Jaworski | 181/120 |
| 4,867,266 | A | | 9/1989 | Martin | 181/106 |
| 4,980,874 | A | * | 12/1990 | Justice, Jr. | 367/190 |
| 4,991,685 | A | * | 2/1991 | Airhart | 181/106 |
| 5,000,285 | A | * | 3/1991 | Airhart | 181/113 |
| 5,115,881 | A | * | 5/1992 | Meynier | 181/106 |
| 5,215,148 | A | * | 6/1993 | Ricles | 166/298 |
| 5,483,026 | A | | 1/1996 | Hasbrouck et al. | 181/121 |
| 6,119,804 | A | | 9/2000 | Owen | 181/113 |
| 6,419,044 | B1 | | 7/2002 | Tite et al. | 181/116 |
| 6,564,150 | B2 | | 5/2003 | Gilmer et al. | 702/14 |
| 6,612,397 | B2 | | 9/2003 | Sparrevik et al. | 181/120 |
| 6,648,097 | B2 | | 11/2003 | Tite et al. | 181/116 |
| 2003/0127227 | A1 | * | 7/2003 | Fehr et al. | 166/306 |

* cited by examiner

*Primary Examiner*—Lincoln Donovan
*Assistant Examiner*—Forrest Phillips
(74) *Attorney, Agent, or Firm*—Baker Botts L.L.P.

(57) ABSTRACT

The present invention provides an accelerated weight drop for use as a seismic energy source, a method for operating an accelerated weight drop for use as a seismic energy source, and a seismic survey system including the accelerated weight drop. The accelerated weight drop, among other elements, includes a strike plate positionable on a surface, and a striker positionable over the strike plate. The accelerated weight drop further includes a compressed gas spring configured to drive the striker toward the strike plate thus creating seismic waves within the surface, wherein the striker is slidably coupled to the compressed gas spring and the striker and the compressed gas spring rotatably coupled to the strike plate about an axis.

49 Claims, 7 Drawing Sheets

ACCELERATED WEIGHT DROP CONFIGURABLE FOR USE AS A SHEAR WAVE SEISMIC ENERGY SOURCE AND A METHOD OF OPERATION THEREOF

CROSS-REFERENCE TO PROVISIONAL APPLICATION

This application claims the benefit of U.S. Provisional Application No. 60/560,903 entitled "ACCELERATED WEIGHT DROP CONFIGURABLE FOR USE AS A SHEAR WAVE SEISMIC ENERGY SOURCE AND A METHOD OF OPERATION THEREOF," to Allen L. Gilmer, filed on Apr. 9, 2004, which is commonly assigned with the present invention and incorporated herein by reference as if reproduced herein in its entirety.

TECHNICAL FIELD OF THE INVENTION

The present invention is directed, in general, to a seismic energy source and, more specifically, to an accelerated weight drop configurable for use as a shear wave seismic energy source, a method of operation thereof, and a seismic survey system including the accelerated weight drop.

BACKGROUND OF THE INVENTION

Seismic geophysical surveys are used in petroleum, gas mineral and water exploration to map the following: stratigraphy of subterranean formations, lateral continuity of geologic layers, locations of buried paleochannels, positions of faults in sedimentary layers, basement topography, and others. Such maps are deduced through analysis of the nature of reflections and refractions of generated seismic waves from interfaces between layers within the subterranean formation.

A seismic energy source is used to generate seismic waves that travel through the earth and are then reflected by various subterranean formations to the earth's surface. As the seismic waves reach the surface, they are detected by an array of seismic detection devices, known as geophones, which transduce waves that are detected into representative electrical signals. The electrical signals generated by such an array are collected and analyzed to permit deduction of the nature of the subterranean formations at a given site.

Seismic energy sources that have been used in geophysical survey methods for petroleum, gas, copper, coal, diamond and other mining exploration operations include explosives, vibratory sources and impact sources. The nature of output seismic energy depends on the type of seismic energy source that was used to generate it.

Explosive seismic energy sources used in petroleum and gas exploration on land rely on the explosion of material placed within a subterranean formation to generate seismic waves. Typically, a hole is drilled in the ground, the explosive is placed in the hole, and backfill is piled on top of the explosive, prior to initiating the explosion. Compared on a pound for pound basis to other energy sources, explosive sources impart a very high amount of seismic energy into the ground. Explosive seismic energy sources currently being used in geophysical survey methods generally produce waves of very high frequency.

Many explosives used in seismic energy sources generate high gas volumes. This is a useful property in mining for moving rock, but is undesirable in seismic exploration, because it decreases the amount of usable seismic energy that is generated. Explosives that produce high volumes of gas cause much of the energy of the explosion to be lost as expanding gases force backfilled material up the borehole into which the explosive was placed. Thus, less of the energy generated by the explosion is transferred into the subterranean formation than would be theoretically possible if less energy was lost to the expansion of generated gases. Further, as the explosives are considered bombs in certain countries, their use is severely limited.

Vibratory sources are also used as seismic energy sources in geophysical survey methods. Two categories of vibratory sources include those that generate seismic waves originating at the surface and those that generate seismic waves that emanate from downhole. One mechanical-hydraulic vibratory source, the Vibroseis truck, is specially designed to place all of its weight onto a large platform which vibrates. This vibration, in turn, produces seismic waves in the subterranean formation. Vibroseis trucks have been used extensively in geophysical survey methods, not just for the petroleum and gas exploration, but also for studying the evolution and development of specific geological structures (e.g., the Rocky Mountains) and fault lines. Vibratory sources tend to produce highly repeatable seismic energy. The nature of the energy delivered into the ground by vibratory sources, its amount, duration, and time of delivery, can be tightly controlled and therefore the seismic energy generated tends to be very reproducible, which is a benefit. However, vibratory sources are often not suited to certain types of terrain. For example if the ground is very soft, it can be difficult to use Vibroseis trucks as a seismic energy source.

Fundamentally, an impact source is a weight striking the surface of the earth directly or impacting a plate placed on the earth's surface, yielding seismic energy. A weight-drop is an example of the former type of impact source. Impact sources tend to be relatively inexpensive, and simple to operate and maintain. Additionally, they do not bring about many of the disadvantages associated with the former two impact sources. Unfortunately, their principal disadvantage is that they are inefficient at continuously producing seismic energy useful for geophysical survey of deeper layers. Impact sources typically tend to yield a relatively high proportion of low frequency, surface waves and output less seismic energy than other seismic energy sources. Also, traditional impact sources are generally unable to reliably produce shear waves.

Accordingly, there is a need in the art for improved seismic methods and geophysical survey systems that rely on impact sources that convert a higher amount of the potential energy in the impact source into seismic energy and may be used to reliably produce shear waves.

SUMMARY OF THE INVENTION

To address the above-discussed deficiencies of the prior art, the present invention provides an accelerated weight drop for use as a seismic energy source, a method for operating an accelerated weight drop for use as a seismic energy source, and a seismic survey system including the accelerated weight drop. The accelerated weight drop, among other elements, includes a strike plate positionable on a surface, and a striker positionable over the strike plate. The accelerated weight drop further includes a compressed gas spring configured to drive the striker toward the strike plate thus creating seismic waves within the surface, wherein the striker is slidably coupled to the compressed gas spring and the striker and the compressed gas spring rotatably coupled to the strike plate about an axis.

As indicated above, the present invention further provides a method for operating an accelerated weight drop for use as a seismic energy source. The method for operating the accelerated weight drop includes positioning the accelerated weight drop discussed above over a surface, and driving the striker toward the strike plate using the compressed gas spring to create seismic waves within the surface.

The present invention further provides a seismic survey system. Without being limited to such, the seismic survey system includes: 1) an accelerated weight drop, as described above, 2) at least one geophone placed proximate the surface, wherein the geophone is configured to collect information from the seismic waves, and 3) a seismic recorder connected to the at least one geophone, the seismic recorder configured to record the collected information.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
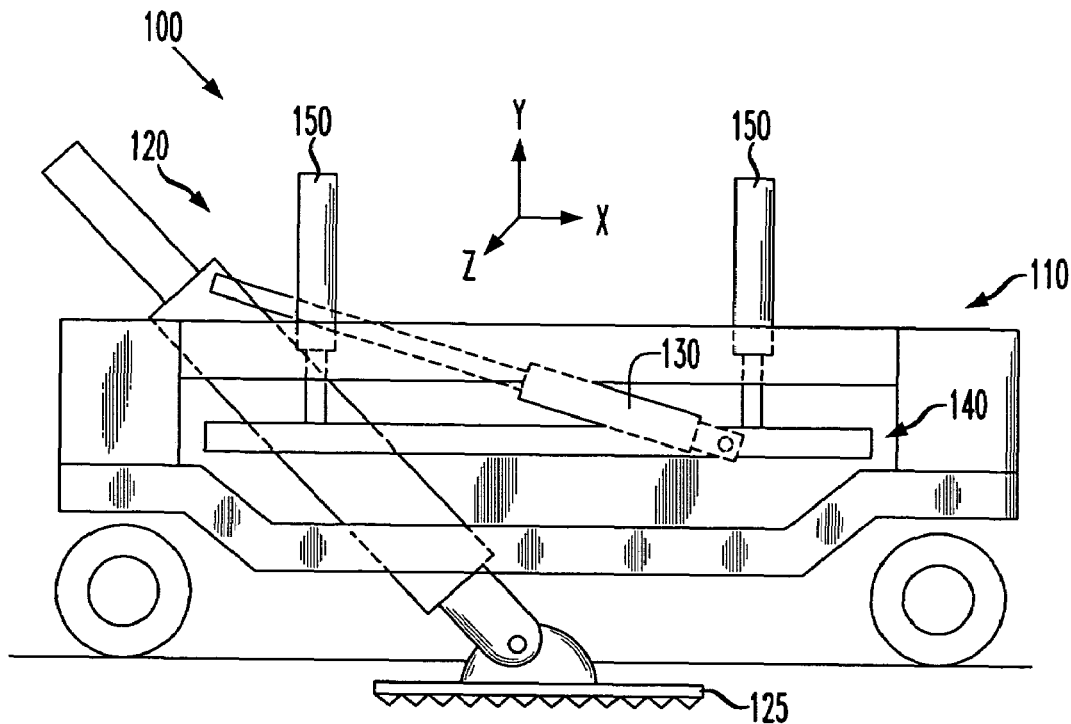
FIGS. 1A & 1B illustrate cross-sectional views of one embodiment of a seismic energy source 100 constructed in accordance with the principles of the present invention.

Referring initially to FIG. 1A illustrated is a cross-sectional view of one embodiment of a seismic energy source 100 constructed in accordance with the principles of the present invention. The embodiment of FIG. 1A illustrates a cross-section of the seismic energy source 100 along a direction it might move. The seismic energy source 100 illustrated in FIG. 1A initially includes a transportable member 110. The transportable member 110 in the embodiment shown in FIG. 1A comprises a trailer, however, those skilled in the art understand that it might comprise a number of different configurations while staying within the scope of the invention. For instance, in certain applications the trailer might be substituted with a motor vehicle. In addition to providing a means by which the seismic energy source 100 may move from one location to another, the transportable member 110 provides weight, or a static load, that will often be used during its operation. For example, again depending on the application, the weight of the seismic energy source 100 may be as much as 10 tons, much of that weight provided by the transportable member 110.

Mounted to the transportable member 110 in the embodiment of FIG. 1A is an accelerated weight drop 120 constructed according to the teachings of the present invention. The accelerated weight drop 120, as will be discussed in more detail below with respect to FIGS. 2-6, includes both a striker and a compressed gas spring. As is illustrated, the accelerated weight drop 120, and particularly the striker and the compressed gas spring, need not be vertically positioned. Actually, the striker and the compressed gas spring are rotatably coupled to a strike plate 125 of the accelerated weight drop 120. For example, in certain embodiments the accelerated weight drop 120 may be positioned up to about 60 degrees or more from vertical. The ability to position the accelerated weight drop 120 at an angle allows the accelerated weight drop 120 to produce shear waves. This is in comparison to the compression waves that are produced when the accelerated weight drop 120 is operated at a substantially vertical angle.

As shown in FIG. 1A, a hydraulic member 130 coupled to a housing of the accelerated weight drop 120 may be used to position the accelerated weight drop 120 at any given angle. It should be noted that while the accelerated weight drop 120 may be positioned up to about 60 degrees or more from vertical, the hydraulic member 130 is capable of positioning the accelerated weight drop in a vertical position. Accordingly, the seismic energy source 100 is capable of producing both shear and compression waves.

The embodiment of the seismic energy source 100 illustrated in FIG. 1A further includes a rotation means 140 for rotating the accelerated weight drop 120 about a vertical axis. Among other well-known rotational means, the rotation means 140 could be a set of gears driven by a motor for rotating the accelerated weight drop 120 about the vertical axis. Using this rotation means 140 feature, the accelerated weight drop 120 may be rotated for conducting a seismic survey in a direction transverse to that shown in FIG. 1A, without having to move the transportable member 110.

Figure 1B:
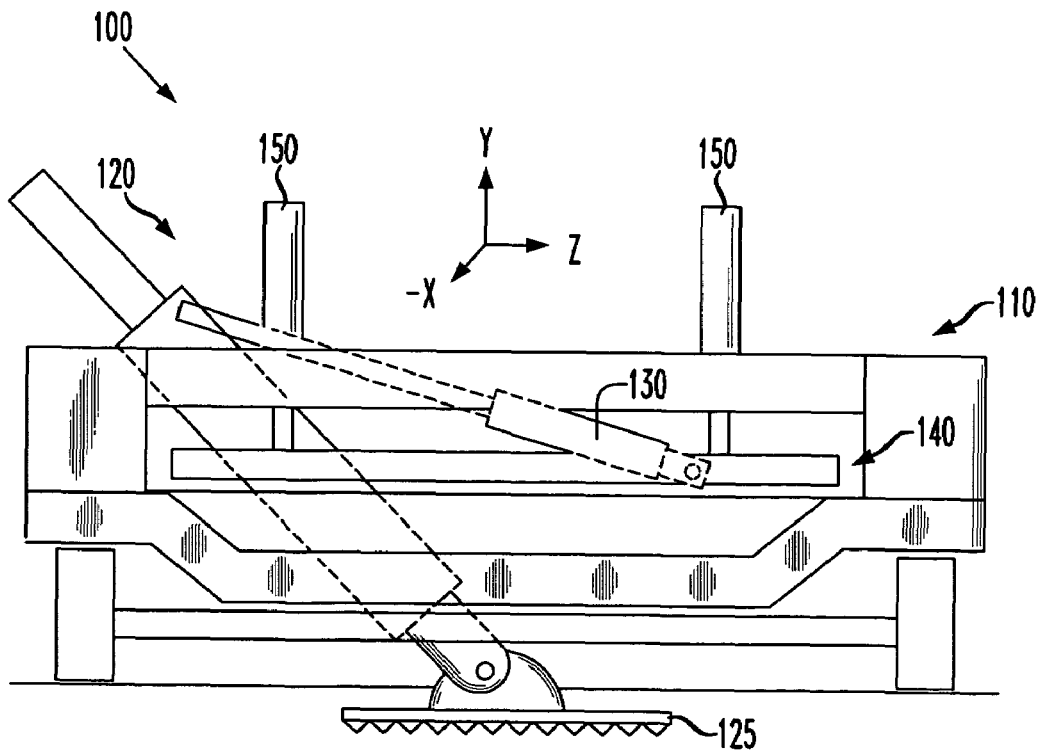

Turning briefly to FIG. 1B, illustrated is a cross-sectional view of the seismic energy source 100 illustrated in FIG. 1A, after the rotation means 140 has rotated the accelerated weight drop 120 to a direction transverse to that shown in FIG. 1A. Notice how the accelerated weight drop 120 in FIG. 1B may now be positioned at various angles from side to side in the transportable member 110, wherein in FIG. 1A it was positionable at various angles from front to back in the transportable member 110.

The seismic energy source 100 illustrated in FIGS. 1A & 1B, among other elements, further includes one or more hydraulic presses 150 coupled to the transportable member 110 and the accelerated weight drop 120. In an exemplary embodiment, the hydraulic presses 150 transfer the weight of the transportable member 110 (e.g., the static load) to the accelerated weight drop 120. This element will be further discussed below.

Figure 2:
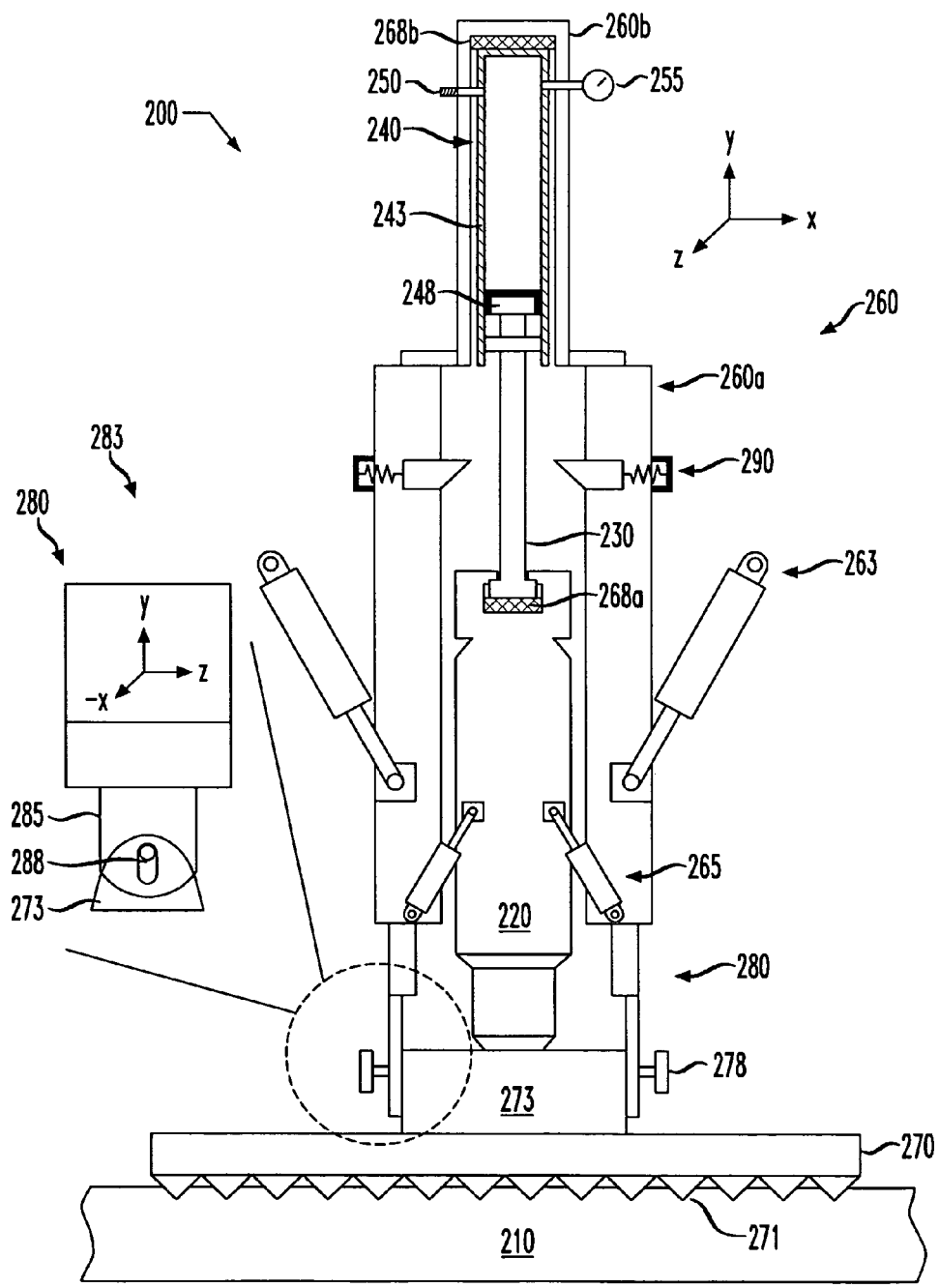
FIG. 2 illustrates a cross-sectional view of one embodiment of an accelerated weight drop for use as a seismic energy source constructed in accordance with the principles of the present invention.

Referring now to FIG. 2, illustrated is a cross-sectional view of one embodiment of an accelerated weight drop 200 for use in a seismic energy source, such as that illustrated in the embodiments of FIGS. 1A & 1B above, constructed in accordance with the principles of the present invention. The accelerated weight drop 200 illustrated in FIG. 2 includes a striker 220 positionable over a surface 210. The surface 210, as one skilled in the in the art of seismic geophysical surveys could imagine, might comprise a number of different surfaces while staying within the scope of the present invention. For example, the surface 210 may comprise soil itself, or in another embodiment might comprise a rigid surface coupled to the soil, such as a cement footing or another similar rigid surface. The rigid surface might be beneficial in loose soil conditions, such as sand, as might be found in petroleum or gas fields throughout the United States or world. Similarly, the surface 210 may comprise both horizontal and vertical surfaces, as well as anything in-between.

The striker 220, which may consist of a hammer like design, is typically a very heavy structure. For example, in one embodiment of the invention the striker has a weight that ranges from about 1000 pounds to about 2500 pounds. This weight, however, may easily be changed or tailored to meet a specific purpose. For instance, where a surface 210 needs a larger seismic energy source than might be provided using the above-referenced 1000 pound to 2500 pound striker 220, the weight of the striker 220 could be increased to accommodate the desired, larger seismic energy source. Similarly, a smaller and more mobile striker 220 could be used in an accelerated weight drop 200 that is configured to be carried and used in a mining shaft by individuals. In such a circumstance a striker 220 weighing between about 25 pounds and about 100 pounds could be used. Given the multiple number of uses for the accelerated weight drop 200, the present invention should not be limited to any specific striker 220 weight.

The striker 220, in the embodiment shown in FIG. 2, comprises an eight-inch diameter cylindrical piece of hardened steel. The diameter, as well as the geometric configuration and the material chosen to form the striker 220, however, could be changed to accommodate the various weights discussed above. In the illustrated embodiment, the striker 220 has a substantially flat surface. This allows the striker 220 to easily transfer its impact load to a contacted surface.

The striker 220, through the use of a push rod 230, is slidably coupled to a compressed gas spring 240. While the embodiment shown in FIG. 2 exhibits the striker 220 slidably connected to a single compressed gas spring 240, it is foreseeable that multiple compressed gas springs be slidably coupled to the striker 220 through push rod 230. The push rod 230 may be any structure capable of connecting the striker 220 to the compressed gas spring 240, and stay within the scope of the present invention. Nonetheless, in the embodiment shown in FIG. 2 the push rod 230 comprise a 2-3 inch diameter steel rod having a material strength sufficient to handle any forces transferred to or from the striker 220.

The compressed gas spring 240, which is configured to drive the striker 220 toward the surface 210, includes a gas chamber 243 and a piston 248. As is illustrated, the piston 248 is configured to slide within the gas chamber 243 to create a pressure therein. This pressure, in turn, will uniquely be used to assist the drive of the striker 220 toward the surface 210 at a high rate of speed.

Both the gas chamber 243 and the piston 248 may comprise conventional materials for their manufacture. As an example, most of the materials used to manufacture the accelerated weight drop 200 could be purchased at any standard steel yard, and if required, could be assembled and tailored where needed by any skilled machinist, given the teachings herein. The gas chamber 243 in the embodiment of FIG. 2 comprises a three-inch diameter bulk pipe having a length of about 29 inches, and an upper surface closed to the atmosphere.

Optionally coupled to the gas chamber 243 is a charging port 250. The charging port 250, which might be a standard air chuck similar to that used on an automobile tire, is configured to charge the gas chamber 243 before, during or after using the accelerated weight drop 200. In an exemplary embodiment, the charging port 250 is used to add nitrogen gas to the gas chamber 243. While any known or hereafter discovered compressible gas could be used to create the pressure within the gas chamber 243, nitrogen gas is very useful as it does not contain the moisture and particulate matter commonly contained within atmospheric air. Additionally, nitrogen is safe to handle and relatively inexpensive to use.

Also, optionally coupled to the gas chamber 243 in the embodiment of FIG. 2 is a pressure gauge 255. As one skilled in the art would expect, the pressure gauge 255 may be used to observe a pressure within the gas chamber 243 before, during or after use of the accelerated weight drop 200. Given this pressure, a calculation means could be used to calculate an impact load that might be placed upon the surface 210 by the striker 220.

Partially surrounding the striker 220, and in the embodiment illustrated and discussed with respect to FIG. 2 surrounding the compressed gas spring 240, is a housing 260. The housing 260, in the disclosed embodiment, includes a main portion 260a and a secondary portion 260b. The main portion 260a acts as a manifold or guide for the striker 220. In the advantageous embodiment shown and discussed with respect to FIG. 2, the main portion 260a consists of a conventional 10 inch diameter 6 foot long piece of bulk pipe at least partially surrounding the striker 220. The main portion 260a may further include a 12 inch by ⅜ inch channel iron that is approximately 6 foot long coupled to the bulk pipe. This channel iron allows other devices, such as a hydraulic press 263 for transferring a static load to the housing 260 or a hydraulic lift 265 for lifting the striker 220 into a cocked position, to be rigidly or removable coupled thereto.

In contrast, the secondary portion 260b extends up and at least partially around the gas chamber 243. In this instance, the secondary portion 260b comprises a five-inch diameter bulk pipe sheathing coupled to the first portion 260a and surrounding the gas chamber 243. Additionally, welded to the top surface of the sheathing may be a ½ inch thick 5¼ inch diameter cap.

Uniquely positioned proximate the compressed gas spring 240 are one or more cushioning means 268. The cushioning means 268, which may comprise a number of different structures without departing from the principles of the present invention, are configured to dissipate reflected energy that might arise during the operation of the accelerated weight drop 200. In the embodiment shown, two cushioning means 268a and 268b are used. As is advantageously illustrated, cushioning means 268a is positioned between the push rod 230 and the striker 220. As is also advantageously illustrated, cushioning means 268b is positioned between the gas chamber 243 and the secondary portion 260b of the housing 260.

While the cushioning means 268 are advantageously illustrated as rubber gaskets in the embodiment illustrated and discussed with respect to FIGS. 2-6, those skilled in the art understand that other structures or materials would suffice. For example, it can be envisioned where the rubber gaskets are exchanged for foam or another absorptive material. Similarly, it can be envisioned where a fluid absorptive bladder could replace one or more of the cushioning means 268.

In an exemplary embodiment of the invention, as shown, a strike plate 270 may be positioned between the striker 220 and the surface 210. Specifically, the strike plate 270 in the embodiment of FIG. 2 is movably coupled to the first portion 260a of the housing 260. The strike plate 270, in this embodiment, is configured to transfer an impact load from the striker 220 to the surface 210, as well as accept a static load from the housing 260. The interplay between the static load and impact load will be discussed further below when discussing how the accelerated weight drop 200 of FIG. 2 might operate.

Optionally coupled to a bottom surface of the strike plate 270 is a gripping means 271. The gripping means 271 is typically designed to create a friction between the strike plate 270 and the surface 210 during operation of the accelerated weight drop 200. The gripping means 271 is of particular importance when the accelerated weight drop 200 is positioned at an angle off of vertical during its operation. As there is a horizontal component introduced into the impact when the accelerated weight drop is operated at an angle, the gripping means attempts to reduce any slipping that might occur as a result of this horizontal component.

In the embodiment shown in FIG. 2 the gripping means 271 comprises a set of teeth coupled to the bottom surface of the strike plate 270. Alternatively, the gripping means 271 could comprise one or more long posts coupled to the bottom surface of the strike plate 270 and driven into the ground by the weight of the transportable member. Other known or hereafter discovered gripping means 271 could also be used.

The strike plate 270 may also, in an advantageous embodiment, have an anvil 273 coupled thereto. For example, a high integrity weld could be used to rigidly couple the anvil 273 to the strike plate 270, or alternatively the two structures could be bolted together. In another advantageous embodiment the strike plate 270 and the anvil 273 could comprise a single structure, such as a structure formed in a single manufacturing process. Either of these configurations, or for that matter other configurations not disclosed, are within the scope of the present invention.

The anvil 273, in an exemplary embodiment, has a surface capable of precisely accepting an impact of the striker 220, independent of the particular angle of which the accelerated weight drop 200 is located. Among others, the anvil 273 could have a cylindrical surface. The cylindrical surface would help the anvil 273 consistently and accurately transfer the impact load from the striker 220 to the strike plate 270. For example, regardless of the angle of impact upon the cylindrical surface, the striker 220 would effectively be impacting along a point. Similarly, the anvil 273 could comprise a polygon. However, if the anvil 273 were to comprise a polygon, the number of positions that the accelerated weight drop 200 might operate would be limited to the number of sides of the polygon.

Extending from a vertical surface of the anvil 273 are pins 278. The pins 278 may either be welded to the anvil 273 or formed in the same manufacturing process as the strike plate 270, anvil 273, or both the strike plate 270 and the anvil 273. Similarly, the pins 278 could be bolted to the anvil 273. As will be shown below, the pins 273 are a point of transfer of the static load from the housing 260 to the strike plate 270. Similarly, the pins 273 act as a point for the housing 260 to be rotatably coupled to the strike plate 270.

An impact isolator 280 may be positioned between the housing 260 and the strike plate 270, and more specifically between the housing 260 and the pins 278 connected to or forming a portion of the strike plate 270. As is shown in the alternate view 283 of the accelerated weight drop 200, the impact isolator 280 may be rigidly coupled to the housing 260 and slidably coupled to the strike plate 270, or pins 278. For instance, in the exemplary embodiment of FIG. 2 the impact isolator 280 comprises a plate 285 having a slot 288 located therein. As can be observed in FIG. 2, the pins 278 are slidably coupled within the slot 288. The importance of the impact isolator 280 will be discussed in detail during the discussion of the method of operating the accelerated weight drop 200.

Uniquely included within the accelerated weight drop 200 is a catch mechanism 290. The catch mechanism 290, which in the embodiment of FIG. 2 happens to be coupled to the housing 260, is designed to hold the striker 220 in a cocked position. Among others, the catch mechanism 290 may comprise a biased dog to hold the striker 220 in the cocked position. The biased dog, such as a trip dog or slide dog, may be configured to cooperatively engage the striker. For instance, the slide dog shown in FIG. 2 is configured to cooperatively engage the notches 225 in the striker 220. Again, it should be understood that the mechanical catch 290 discussed herein is but one example and that one who is skilled in the art would be able to arrive at other catch mechanisms, given the teachings of the present invention.

The accelerated weight drop 200 illustrated in FIG. 2 may contain other features that are also within the scope of the present invention. For example, one important feature of the present invention, which is not shown, is a safety mechanism that prevents the striker 220 from dry firing. The striker 220, when in the transportation mode, should not be fired. Therefore, the safety mechanism prevents the striker 220 from firing if the strike plate 270 is not located on the surface 210, and a static load has not yet been placed on the strike plate 270.

Figure 3:
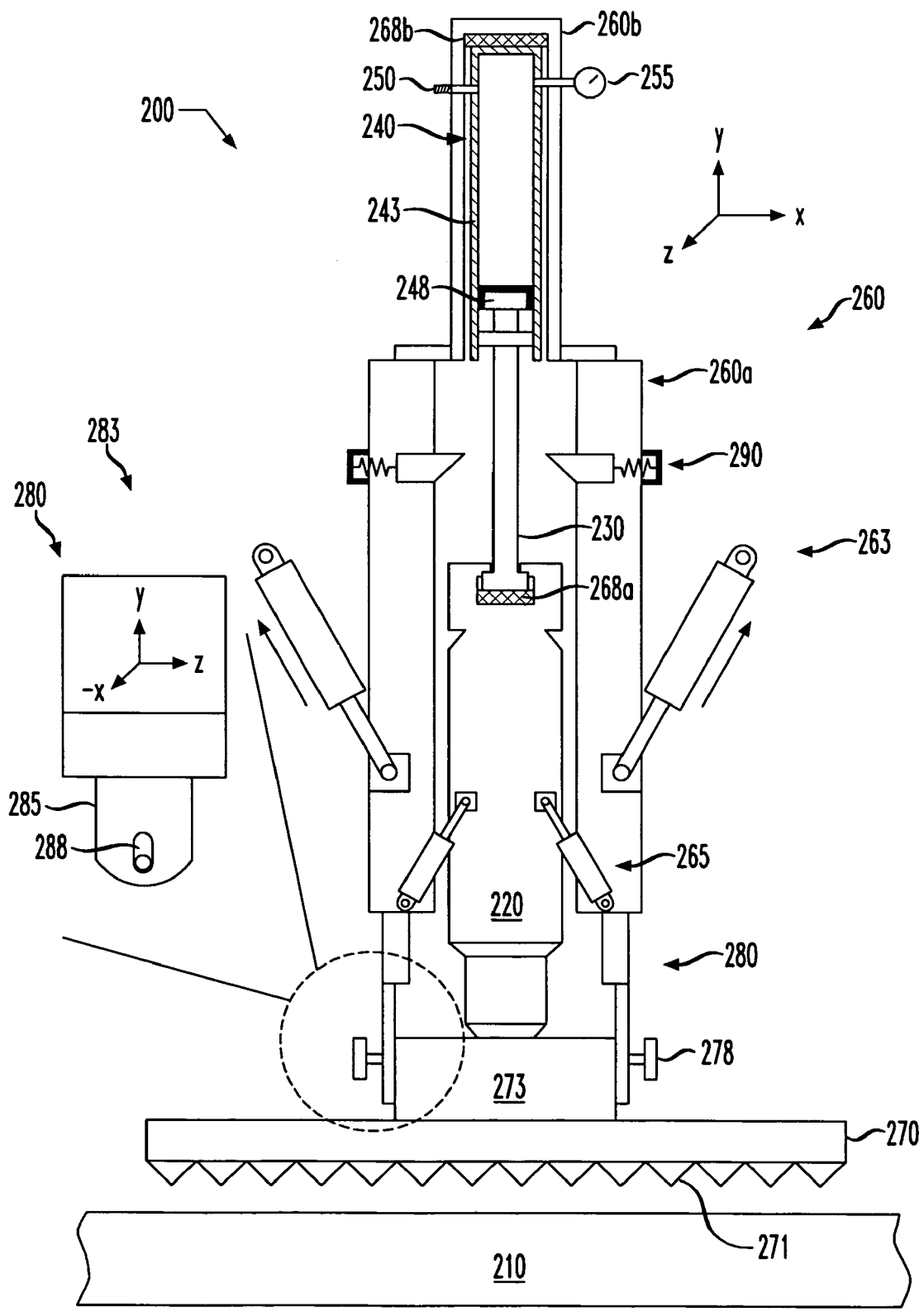
FIGS. 3-6 illustrate simple schematic cross-sectional views illustrating how one might operate an accelerated weight drop manufactured in accordance with the principles of the present invention as a seismic energy source.

Turning now to FIGS. 3-6 illustrated are simple schematic cross-sectional views illustrating how one might operate an accelerated weight drop manufactured in accordance with the principles of the present invention as a seismic energy source. FIG. 3 illustrates an accelerated weight drop 200 in a configuration that might be used for its transportation. For example, in the embodiment of FIG. 3, the hydraulic presses 263 are retracted causing the strike plate 270 to be held a distance off of the surface 210. While it is shown that the strike plate 270 is only held a small distance above the surface 210 when the hydraulic presses 263 are completely retracted, this distance can be increased by changing the throw distance of the hydraulic presses 263. Similarly, devices other than the hydraulic presses 263 could be used to retract the housing 260 and strike plate 270 and stay within the scope of the present invention.

As is noticed in FIG. 3, the pins 278 slide to the lowest portion of the slot 288 when the hydraulic presses 263 are retracted. The pins 278, which are physically connected to the anvil 273 of the strike plate 270, are, therefore, the point at which the strike plate 270 is lifted. This unique feature eliminates the need to have to position the strike plate 270 in place after the accelerated weight drop 200 reaches its desired destination. As a result, the strike plate 270 is self-aligning before and after each set-up.

At this stage, the gas chamber 243 may or may not be charged with the desired gas. Often, the gas chamber 243 always remains charged to some extent or another. In such an instance, the charging port 250 would only be used to recharge the gas chamber 243 after some or all of the gas undesirably escaped therefrom, to add additional gas into the chamber thereby increasing the impact load of the striker 220, or to evacuate the gas chamber 243 to perform service thereon. The pressure gauge 255 could be used to monitor the pressure within the gas chamber 243.

Optionally connected to the gas chamber 243 and a gas source may be a gas monitoring and injection system. For example, a device capable of monitoring the pressure within the gas chamber 243 and maintaining a predetermined pressure within the gas chamber 243 could be used. When the gas monitoring and injection system determines that the gas chamber 243 deviates from the predetermined gas pressure, it injects gas into the gas chamber 243 to restore it to the predetermined pressure. In this instance, the gas chamber 243 could always have the same predetermined pressure, regardless of any small gas leaks that might be present.

Figure 4:
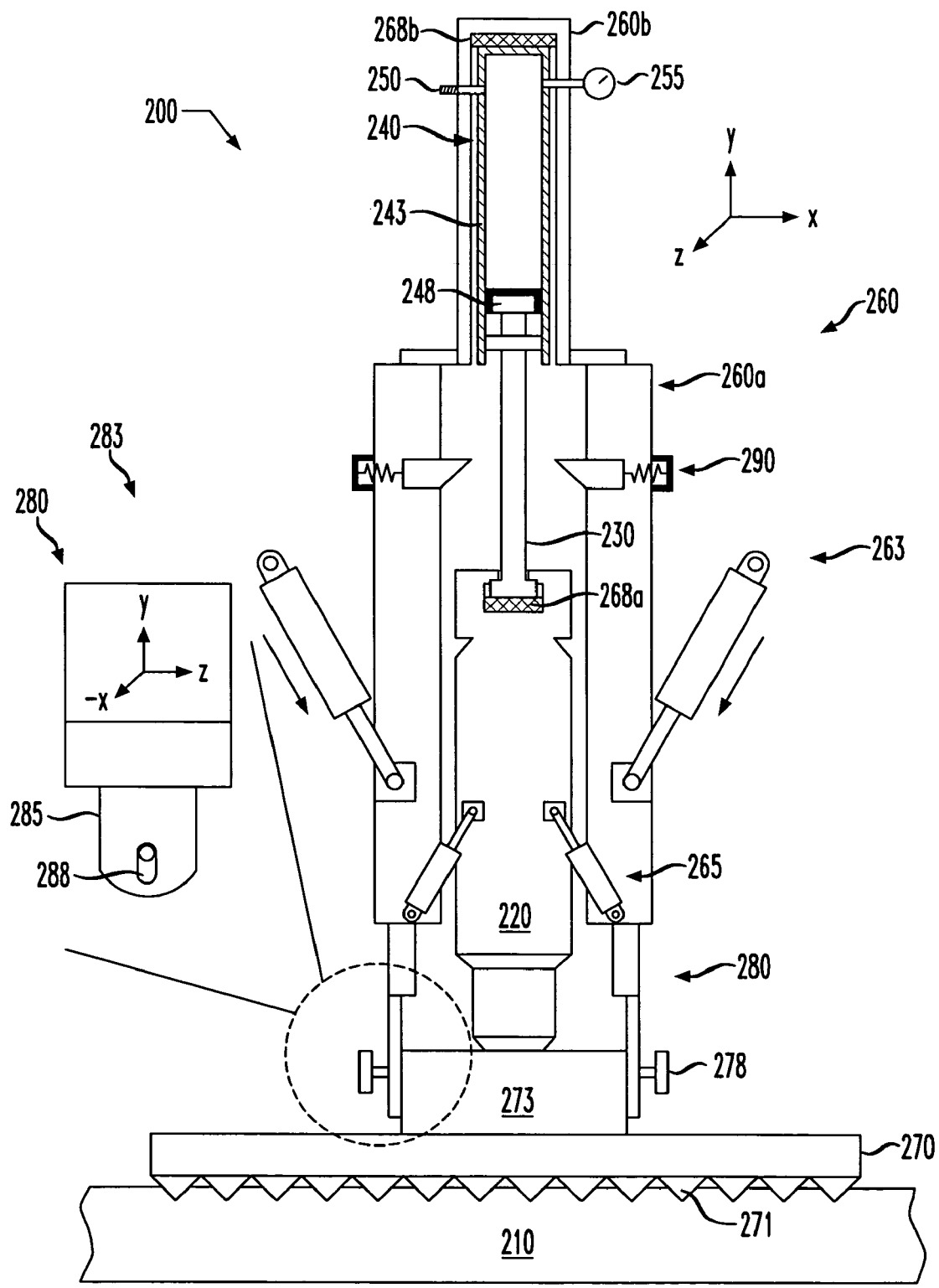

Turning now to FIG. 4, illustrated is the accelerated weight drop 200 illustrated in FIG. 3 after it has been positioned in a desired location and the strike plate 270 placed upon the surface 210. This can be accomplished by extending the hydraulic presses 263, thereby causing the strike plate 270 to approach the surface 210. Further, not only does the extension of the hydraulic presses 263 cause the strike plate 270 to approach the surface 210, the entire weight of the structure (e.g., a static load) may be placed upon the strike plate 270 through the housing 260 and the impact isolator 280. Note how the pins 278 are now located in an upper most portion of the slot 288 in the plate 285. This static load, as will be discussed further below, helps transfer a substantial portion of the impact load directly to the surface 210.

Figure 5:
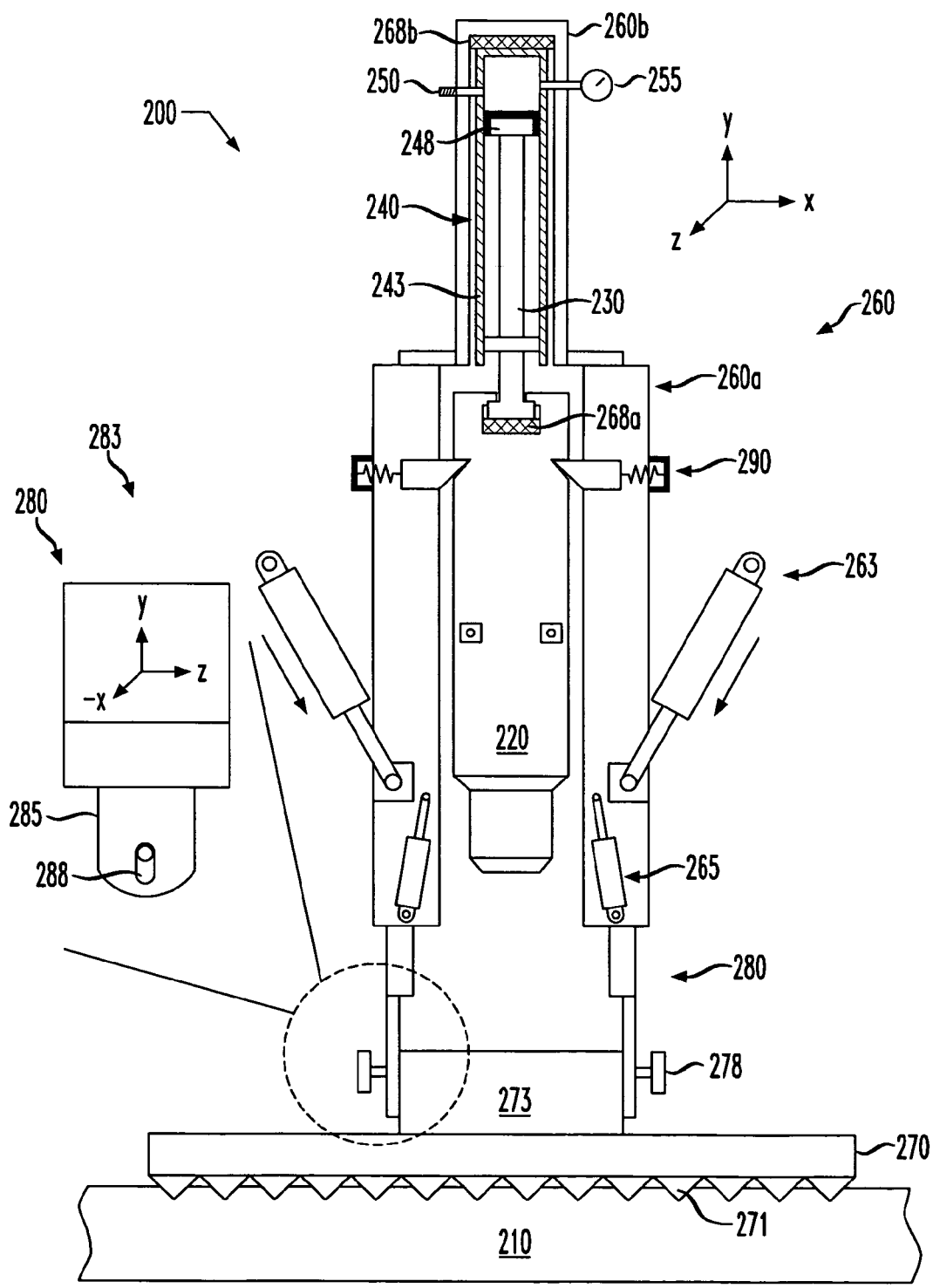

Turning now to FIG. 5, illustrated is the accelerated weight drop 200 of FIG. 4, after the striker 220 has been placed in a cocked position. Unique only to the present invention, the cocking of the striker 220 causes the original volume of the gas chamber 243 to decrease substantially. But for the catch mechanism 290, the decreased volume would tend to cause the striker 220 to drive toward the surface 210, thus creating seismic waves therein. Obviously, however, at this point the catch mechanism 290 would keep the striker 220 in the cocked position.

Any sort of cocking means, such as the hydraulic lift 265 coupled to the striker 220, could be used to lift the striker 220 to a cocked position. While the hydraulic lift 265 is illustrated FIG. 5 as lifting the striker 220, those skilled in the art understand that any known or hereafter discovered device capable of lifting the striker 220 to a cocked position is also within the scope of the present invention. For example, the lifting mechanism might consist of cooperative ratchet gears or cable and pulley systems used to lift the striker to a cocked position.

If desired, the gas chamber 243 may be further charged using the charging port 250 after the striker 220 has been cocked. As one would expect, the addition of the added gas within the gas chamber 243 would increase the force the striker 220 is capable of delivering to the strike plate 270.

Figure 6:
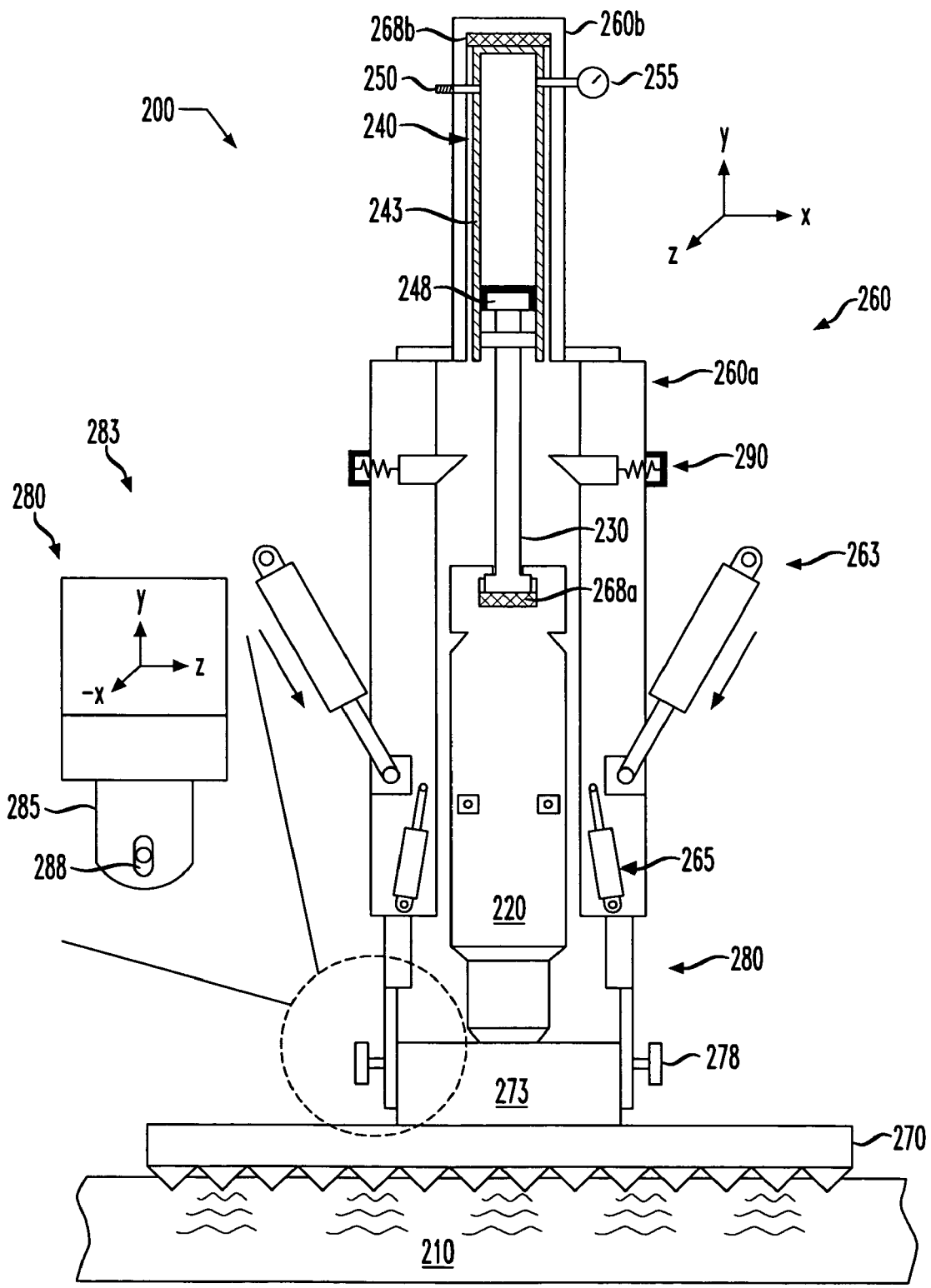

Turning now to FIG. 6, illustrated is the accelerated weight drop 200 illustrated in FIG. 5 after the catch mechanism 290 has been triggered and the striker 220 is contacting the strike plate 270. More specifically, the illustration of FIG. 6 represents a snapshot of a brief moment right after the striker 220 contacts the strike plate 270. At this brief moment the housing 260 is isolated from the pins 278 of the strike plate 270. For example, as is shown in the alternate view 283, the pins 278 are suspended within the slot 288 of the impact isolator 280 at this brief moment. This suspension allows the striker 220 to transfer substantially all of its impact load directly on the strike plate 270 with limited loss of energy being reflected back up the housing 260. This is at least partially a function of the length of the slot 288 being located substantially in line with a line of impact of the striker 220. Further, not only does the impact isolator 280 allow the impact load to be efficiently transferred to the strike plate 270, and thus surface 210, the reduced reflection allows the accelerated weight drop to have a much longer effective lifespan.

By the time the pins 278 spring back up within the slot 288 in the impact isolator 270 as a result of the static load being placed thereon, a majority of the impact load has already been efficiently transferred to the surface 210. Therefore, the reflection to the housing 260 is minimal. A reflection may exist up the striker 220, through the push rod 230 and to the gas chamber 243. The cushioning means 268 are, therefore, placed proximate the gas chamber 243 and striker 220 to absorb this reflected energy.

The accelerated weight drop constructed in accordance with the principles of the present invention provides many of the benefits associated with traditional seismic energy sources without providing their drawbacks. For instance, the accelerated weight drop constructed in accordance with the principles of the present invention is capable of providing a much greater impact load for its size, than could be provided by the prior art accelerated weight drop systems. For this reason, the accelerated weight drop constructed in accordance with the principles of the present invention may be manufactured much smaller than the prior art devices, and therefore, is much easier to operate and move from site to site. Additionally, the accelerated weight drop constructed in accordance with the principles of the present invention does not have the legal constraints associated with using the explosive sources, as well as does not have the placement constraints associated with the vibratory sources.

It should be noted that while the embodiments shown and discussed with respect to FIGS. 2-6 are being operated at a substantially vertical position, the accelerated weight drop 200 could be operated in a similar fashion with a non-vertical position. For example, if the accelerated weight drop 200 illustrated in FIGS. 2-6 were positioned similar to the accelerated weight drop 120 illustrated in FIGS. 1A & 1B, but for a few small changes the operation would be as discussed with regard to FIGS. 2-6.

Figure 7:
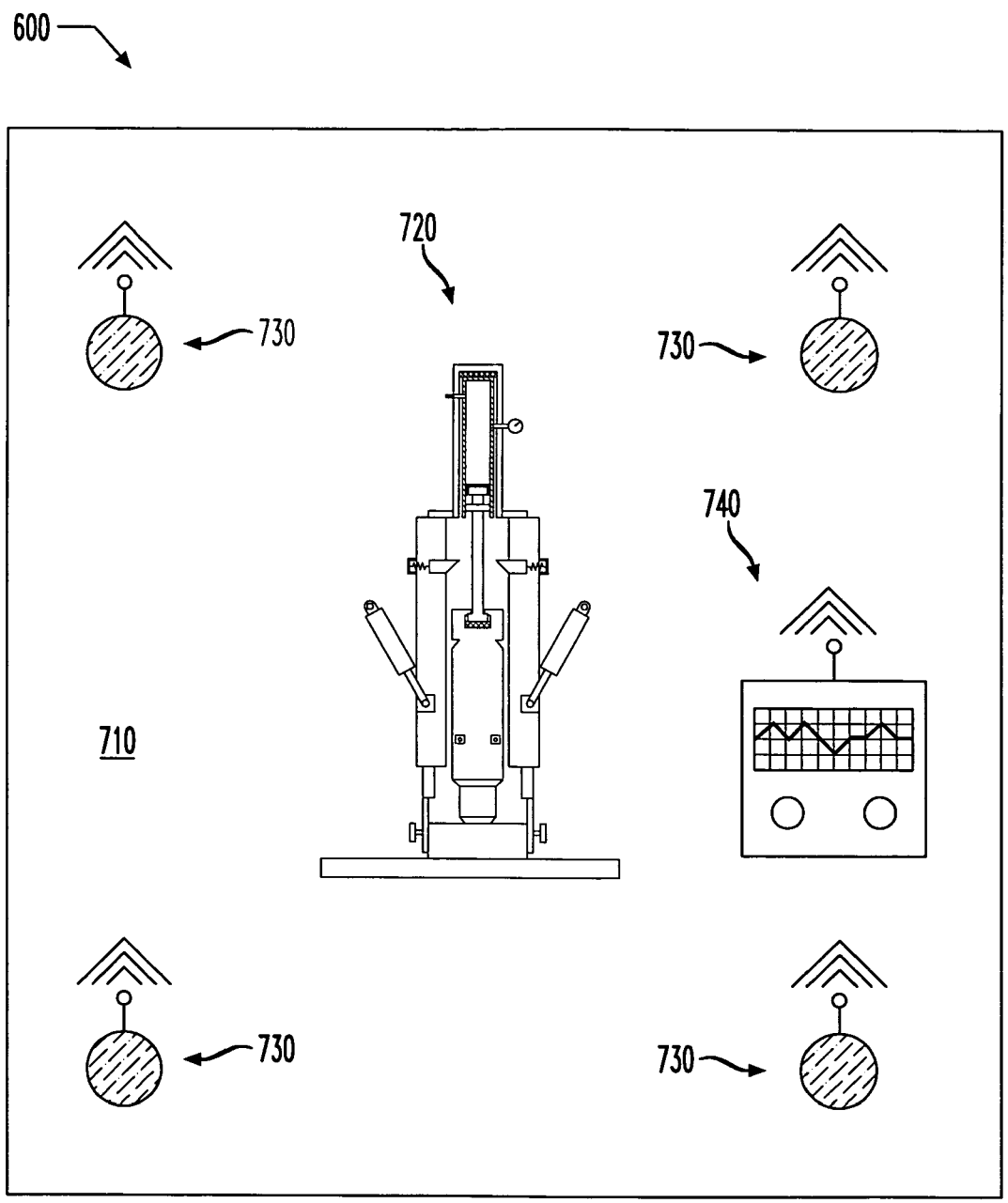
FIG. 7 illustrates a seismic survey system constructed in accordance with the principles of the present invention.

Turning briefly to FIG. 7, illustrated is a seismic survey system 600 constructed in accordance with the principles of the present invention. The seismic survey system 600 illustrated in FIG. 7 initially includes an accelerated weight drop 620, which might be similar to the accelerated weight drop 200 illustrated in FIG. 2, positioned over a surface 610 to create seismic waves therein.

Placed proximate the surface 610 for collecting information from the seismic waves created by the accelerated weight drop 620 is at least one geophone 630. In the embodiment illustrated in FIG. 7, four geophones 630 are being used. Those skilled in the art understand, however, that any number of geophones 630 could be used and stay within the scope of the present invention. Wirelessly connected to the geophones 630 in the embodiment illustrated in FIG. 7 is a seismic recorder 640 configured to record the collected information. I should be noted that the seismic recorder 640 could just as easily been hardwired to the geophones 630.

Although the present invention has been described in detail, those skilled in the art should understand that they can make various changes, substitutions and alterations herein without departing from the spirit and scope of the invention in its broadest form.

What is claimed is:

1. An accelerated weight drop for use as a seismic energy source, comprising:
   a strike plate positionable on a surface;
   a striker positionable over said strike plate;
   a housing at least partially surrounding the striker;
   an impact isolator rigidly coupled to said housing and slidably coupled to said strike plate, wherein said impact isolator comprises a plate having a slot formed therein;
   an anvil rigidly coupled to said strike plate;
   a pin coupled to the anvil, said pin slidably coupled within said slot, wherein said pin facilitates self-alignment of said strike plate;
   a compressed gas spring, said striker slidably coupled to said compressed gas spring, and said striker and said compressed gas spring rotatably coupled to said strike plate about an axis, said compressed gas spring configured to drive said striker toward said strike plate, thus creating seismic waves within said surface; and
   a first cushioning element positioned proximate said compressed gas spring and positioned to dissipate reflected energy occurring through said striker during creation of said seismic waves.

2. The accelerated weight drop as recited in claim 1 wherein said compressed gas spring includes a gas chamber and a piston, wherein said piston is configured to slide within said gas chamber to compress a gas therein to create a pressure that drives said striker toward said strike plate.

3. The accelerated weight drop as recited in claim 2 further comprising a charging port coupled to said gas chamber, said charging port configured to provide said gas within said gas chamber.

4. The accelerated weight drop as recited in claim 2 wherein said compressed gas spring further includes a push rod and said push rod connects said piston to said striker.

5. The accelerated weight drop as recited in claim 4 further including a second cushioning element located between said push rod and at least a portion of said striker for dissipating reflected energy.

6. The accelerated weight drop as recited in claim 1 further including a catch mechanism coupled to said housing and configured to hold said striker in a cocked position.

7. The accelerated weight drop as recited in claim 6 wherein said catch mechanism includes a trip dog coupled to said housing and configured to cooperatively engage said striker.

8. The accelerated weight drop as recited in claim 1 wherein said housing is coupled to a static load and is configured to transfer said static load to said strike plate.

9. The accelerated weight drop as recited in claim 8 further comprising a hydraulic press coupled to said housing, said hydraulic press configured to create said static load.

10. The accelerated weight drop as recited in claim 1, wherein a length of said slot is positioned substantially in line with a line of impact of said striker.

11. The accelerated weight drop as recited in claim 1 wherein said housing has a main portion and a secondary portion, said main portion at least partially surrounding said striker and said secondary portion at least partially surrounding said compressed gas spring.

12. The accelerated weight drop as recited in claim 1 further including a hydraulic member coupled to said housing for rotating said striker and said compressed gas spring about said axis.

13. The accelerated weight drop as recited in claim 1 further comprising a hydraulic lift coupled to said striker, said hydraulic lift configured to lift said striker to a cocked position.

14. The accelerated weight drop as recited in claim 1 further including an anvil having one or more pins therein coupled to said strike plate, wherein said one or more pins allow said striker and said compressed gas spring to be rotatably coupled to said strike plate.

15. The accelerated weight drop as recited in claim 14 wherein said anvil has a cylindrical surface, said cylindrical surface allowing said striker to impact said anvil along a point, independent of an angle of impact of said striker to said strike plate.

16. The accelerated weight drop as recited in claim 1 wherein said striker and said compressed gas spring may rotate from a vertical position about said axis by up to about 60 degrees.

17. The accelerated weight drop as recited in claim 1 wherein said axis is a first axis, and further wherein said striker, said compressed gas spring and said strike plate are mounted to a transportable member and rotatable with respect to said transportable member about a second vertical axis.

18. The accelerated weight drop as recited in claim 17 further including a rotation means for rotating said striker, said compressed gas spring and said strike plate with respect to said transportable member about said second vertical axis.

19. The accelerated weight drop as recited in claim 1 further including a gripping means coupled to a bottom surface of said strike plate for reducing slippage of said strike plate upon said surface when said compressed gas spring drives said striker toward said strike plate.

20. A method for operating an accelerated weight drop for use as a seismic energy source, comprising:
    positioning an accelerated weight drop over a surface, wherein positioning the accelerated weight drop comprises:
        positioning a strike plate on said surface;
        positioning a striker over said strike plate;
        at least partially surrounding said striker with a housing;
        rigidly coupling an impact isolator to said housing and slidably coupling said impact isolator to said strike plate, wherein said impact isolator comprises a plate having a slot formed therein;
        rigidly coupling an anvil to said strike plate;
        coupling a pin to said anvil and slidably coupling said pin within said slot to facilitate self-alignment of said strike plate;
        slidably coupling a compressed gas spring, to said striker and said striker and said compressed gas spring rotatably coupled to said strike plate about an axis;
        positioning a first cushioning element proximate said compressed gas spring to dissipate reflected energy occurring through said striker during creation of seismic waves; and
    driving said striker toward said strike plate using said compressed gas spring to create seismic waves within said surface.

21. The method as recited in claim 20 wherein said compressed gas spring includes a gas chamber and a piston, further including cocking said accelerated weight drop by sliding said piston within said gas chamber to reduce a volume of said gas chamber thereby pressurizing a gas located therein, said pressurized gas used to drive said striker toward said strike plate to create said seismic waves.

22. The method as recited in claim 21 wherein said compressed gas spring further includes a push rod and said push rod connects said piston to said striker, and further wherein a hydraulic lift is coupled to said striker to slide said piston within said gas chamber to reduce said volume of said gas chamber.

23. The method as recited in claim 22 further including a second cushioning element located between said push rod and at least a portion of said striker.

24. The method as recited in claim 22 wherein a catch mechanism holds said striker in a cocked position after sliding said piston within said gas chamber to reduce said volume of said gas chamber.

25. The method as recited in claim 24 wherein said catch mechanism includes a trip dog coupled to a housing of said accelerated weight drop and configured to cooperatively engage said striker.

26. The method as recited in claim 24 further including tripping said catch mechanism thereby causing said striker to drive toward said strike plate.

27. The method as recited in claim 21 wherein a charging port is coupled to said gas chamber, and further including charging said gas chamber using said charging port.

28. The method as recited in claim 20 wherein said housing has a main portion and a secondary portion, said main portion at least partially surrounding said striker and said secondary portion at least partially surrounding said compressed gas spring.

29. The method as recited in claim 20 further including coupling said housing to a static load, wherein said housing is configured to transfer said static load to said strike plate.

30. The method as recited in claim 20, wherein a length of said slot is positioned substantially in line with a line of impact of said striker.

31. The method as recited in claim 29 further comprising a hydraulic press coupled to said housing, said hydraulic press configured to create said static load.

32. The method as recited in claim 20 further including rotating said striker and said compressed gas spring about said axis using a hydraulic member coupled to said housing.

33. The method as recited in claim 20 further including an anvil having one or more pins therein coupled to said strike plate, wherein said one or more pins allow said striker and said compressed gas spring to be rotatably coupled to said strike plate.

34. The method as recited in claim 33 wherein said anvil has a cylindrical surface, said cylindrical surface allowing said striker to impact said anvil along a point, independent of an angle of impact of said striker to said strike plate.

35. The method as recited in claim 20 wherein said striker and said compressed gas spring may rotate from a vertical position about said axis by up to about 60 degrees.

36. The method as recited in claim 20 wherein said axis is a first axis, and further wherein said striker, said compressed gas spring and said strike plate are mounted to a transportable member and rotatable with respect to said transportable member about a second vertical axis.

37. The method as recited in claim 36 further including a rotation means for rotating said striker, said compressed gas spring and said strike plate with respect to said transportable member about said second vertical axis.

38. The method as recited in claim 20 further including a gripping means coupled to a bottom surface of said strike plate for reducing slippage of said strike plate upon said surface when said compressed gas spring drives said striker toward said strike plate.

39. A seismic survey system, comprising:
   an accelerated weight drop, including;
      a strike plate positionable on a surface;
      a striker positionable over said strike plate;
      a housing at least partially surrounding said striker;
      an impact isolator rigidly coupled to said housing and slidably coupled to said strike plate, wherein said impact isolator comprises a plate having a slot formed therein;
      an anvil rigidly coupled to said strike plate;
      a pin coupled to the anvil, said pin slidably coupled within said slot, wherein said pin facilitates self-alignment of said strike plate;
      a compressed gas spring, said striker slidably coupled to said compressed gas spring, and said striker and said compressed gas spring rotatably coupled to said strike plate about an axis, said compressed gas spring configured to drive said striker toward said strike plate, thus creating seismic waves within said surface; and
      a cushioning element positioned proximate said compressed gas spring and positioned to dissipate reflected energy occurring through said striker during creation of said seismic waves;
   at least one geophone placed proximate said surface, said at least one geophone configured to collect information from said seismic waves; and
   a seismic recorder connected to said at least one geophone, said seismic recorder configured to record said collected information.

40. The seismic survey system as recited in claim 39 wherein said housing is coupled to a static load and is configured to transfer said static load to said strike plate.

41. The seismic survey system as recited in claim 39, wherein a length of said slot is positioned substantially in line with a line of impact of said striker.

42. The seismic survey system as recited in claim 41 further including an anvil having a pin therein coupled to said strike plate, wherein said pin is slidably coupled within said slot.

43. The seismic survey system as recited in claim 39 further including a hydraulic member coupled to said housing for rotating said striker and said compressed gas spring about said axis.

44. The seismic survey system as recited in claim 39 further including an anvil having one or more pins therein coupled to said strike plate, wherein said one or more pins allow said striker and said compressed gas spring to be rotatably coupled to said strike plate.

45. The seismic survey system as recited in claim 44 wherein said anvil has a cylindrical surface, said cylindrical surface allowing said striker to impact said anvil along a point, independent of an angle of impact of said striker to said strike plate.

46. The seismic survey system as recited in claim 39 wherein said striker and said compressed gas spring may rotate from a vertical position about said axis by up to about 60 degrees.

47. The seismic survey system as recited in claim 39 wherein said axis is a first axis, and further wherein said striker, said compressed gas spring and said strike plate are mounted to a transportable member and rotatable with respect to said transportable member about a second vertical axis.

48. The seismic survey system as recited in claim 47 further including a rotation means for rotating said striker, said compressed gas spring and said strike plate with respect to said transportable member about said second vertical axis.

49. The seismic survey system as recited in claim 39 further including a gripping means coupled to a bottom surface of said strike plate for reducing slippage of said strike plate upon said surface when said compressed gas spring drives said striker toward said strike plate.

* * * * *